Patented May 13, 1941

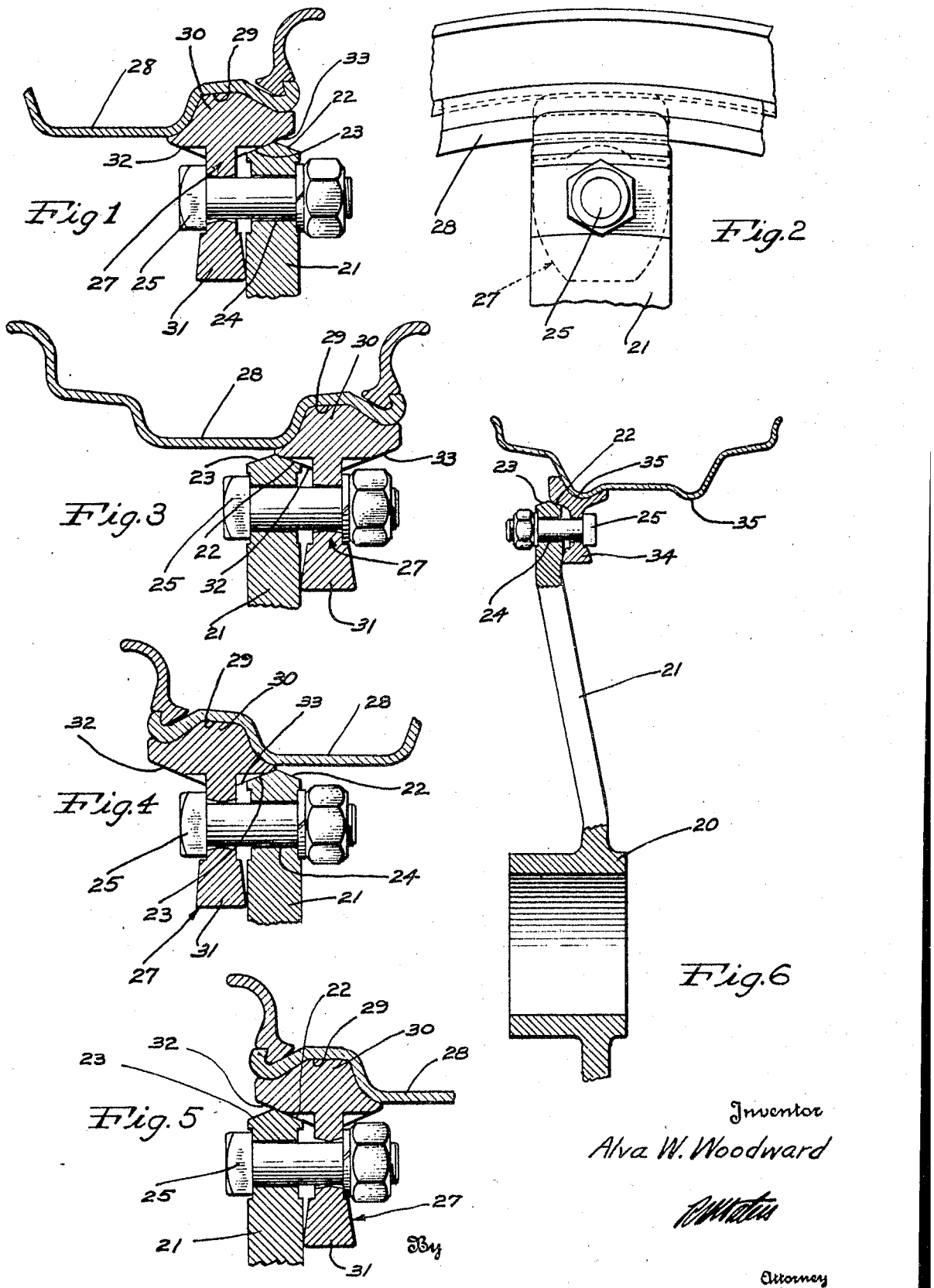

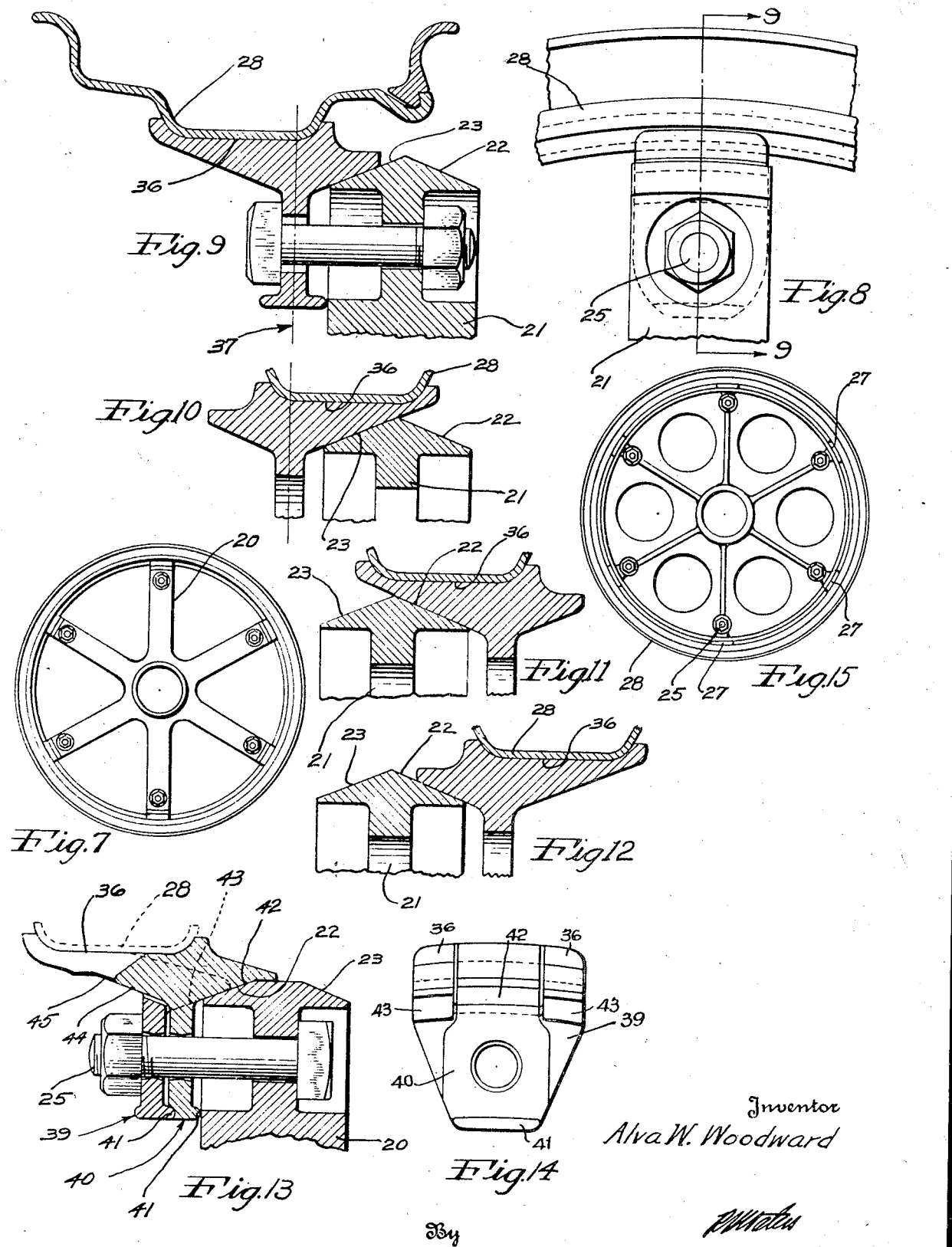

2,241,839

UNITED STATES PATENT OFFICE 2,241,839

RIM MOUNTING

Alva W. Woodward, Kent, Ohio, assignor to Wingfoot Corporation, Wilmington, Del., a corporation of Delaware Application November 7, 1936, Serial No. 109,723

13 Claims. (Cl. 301—12)

The present invention relates to wheels and rims and particularly the means for mounting the rim on the wheel, whether it is purely a spoke wheel or a wheel having a felloe arranged peripherally thereof, or a wheel formed as a disc.

One object of this invention is to provide simple means for mounting the rim in different axial positions with respect to the wheel whereby the tread width of the vehicle with which the same is used may be varied. This is particularly desirable in connection with farm implements which are used to straddle rows of crops having different spacings with respect to each other.

Another object of this invention is to provide mounting means for the rim comprising a series of lugs adapted to be mounted selectively on either side of the wheel to give different rim spacings axially of the wheel, and also construct the lugs so that by reversing the position of the lug itself a different axial spacing of the rim will result.

Another object of this invention is to provide a special type rim adapted to cooperate with lugs of the character described.

A still further object of this invention is to provide a rim and/or lug having suitable specially cooperating portions for holding the rim firmly in position upon radial movement of the lug when the clamping of the lug takes place.

A still further object of the invention is to provide in a device of this character a split lug which exerts a clamping action on the rim axially of the wheel as well as exerting outward radial pressure to hold the same in position.

Other objects of this invention will appear hereinafter as the description hereof proceeds, the novel features, arrangements and combinations being clearly set forth in the specification and in the claims thereunto appended.

In the drawings:

Fig. 1 is a fragmentary cross-section through a wheel embodying my invention;

Fig. 2 is a side elevation of Fig. 1 looking from the right of that figure.

Figs. 3, 4 and 5 are views similar to Fig. 1 showing the parts of my invention in different positions of adjustment to give different tread widths;

Fig. 6 shows a modified form of my invention as applied to a rim of different construction;

Fig. 7 is a side elevation of a spoke wheel embodying my invention;

Fig. 8 is a fragmentary enlarged view of a rim applied to a spoke end, such as disclosed in Fig. 7;

Fig. 9 is a cross-section taken along the line 9—9 of Fig. 8;

Figs. 10, 11 and 12 are views similar to Fig. 9 showing the parts in different positions of adjustment relative to each other to give different tread widths for the vehicle;

Fig. 13 is a view similar to Fig. 9, showing a modified form of lug;

Fig. 14 is a view of the lug shown in Fig. 13 as viewed from the right in Fig. 13; and Fig. 15 in a view similar to Fig. 7 showing my invention applied to a wheel having a continuous rim.

The principal object of this invention is to provide a simple, rugged means which may be used to quickly space rims on wheels at different axial positions whereby the tread width of the vehicle with which the wheels and rims are used can be quickly varied.

In Figs. 1 to 5 inclusive, I have shown my invention as applied to a wheel 20 having radial spokes 21, the outer ends of which are provided with a pair of tapered seats 22 and 23 and openings 24 to receive clamping bolts for clamping lugs on the ends of the wheel spokes. Each of the spokes is provided with a clamping bolt 25 and a clamping lug 27. A rim 28 has a peripheral channel 29 on the under side thereof for the reception of the outwardly projecting portion 30 of the lug 27 which is shaped to fit snugly within the channel and support the rim. The lug is also provided at its lower end with a flared tail piece 31 and with seats 32 and 33 adapted to engage selectively either of seats 22 or 23 on the spoke.

In Fig. 1 I have shown the lug applied to the left-hand side of the spoke with the seats 33 and 23 in engagement with each other. When the bolts which connect the several lugs to the spokes are tightened the lugs move radially outward due to the camming action of the tapered seats 23 and 33, thus firmly pressing the lugs against the rim to hold the same firmly in position and to prevent lateral play in same. It will be noted that the flared tail piece forms a pivot point about which the lug pivots as the lug moves into operative position during the clamping of the bolts and prevents canting of the lugs in use.

For the purpose of description it will be assumed that in Fig. 1 the vehicle to which the wheel is applied is at the left with a similar, but reversely mounted, rim on a wheel on the opposite side of the vehicle, thus giving a predetermined tread width from center to center of the rims.

In Figs. 3, 4 and 5 I have illustrated the wheel in the same position as in Fig. 1 but I have changed the position of the lug in Fig. 3 to bring the seats 32 and 22 into engagement with the rim which is positioned the same as in Fig. 1 with respect to the lug.

In Figs. 4 and 5 the lugs are arranged on the same side of the spokes as in Figs. 1 and 3 respectively but the lugs and rims are reversed to throw the center of the rim more to the right. With this arrangement four different tread widths for the vehicle may be obtained if only one rim is changed at a time instead of adjusting the rims on both sides of the vehicle similarly so as to maintain the balanced relation between the rims and the vehicle.

In Figs. 6 and 7 I have illustrated a similar construction in which the same reference characters refer to similar parts but in this case the lug 34 is recessed to receive a projecting rib 35 on the under side of the rim instead of being constructed as in Figs. 1 to 5 inclusive. There are a plurality of ribs 35 which makes it unnecessary to reverse the position of the rim when making a change in the tread width, for upon reversal of the lug 34 the other of the ribs 35 may be used.

In Figs. 9 to 12 inclusive I have illustrated a different form for the lug in which the lug has a recess 36 which is offset from the center line 37 of the lug whereby merely upon reversal of the position of the lug (see Figs. 9 and 10) and without changing the lug from one side of the wheel to the other a different spacing of the rim is accomplished, the rim in this case being provided with a central, downwardly projecting rib which forms the channel of a drop-center-type tire. It is not necessary, however, that this rib be centrally arranged with respect to the rim as the rim may be constructed as in Fig. 6. Then, by positioning the lug on the opposite side of the wheel, two more positions of the rim may be obtained by reversing the position of the lug as shown in Figs. 11 and 12.

In Fig. 15 I have illustrated a disc-type wheel 38 which has a plurality of lugs 27 and bolts 25 for clamping the rim 28 in position. In this case the entire felloe of the wheel may be provided with oppositely beveled seats, such as 22 and 33, extending entirely about the periphery thereof, or these tapered seats may be arranged only at the lug-clamping position.

In Figs. 13 and 14 I have shown a lug which in effect is similar to the lug shown in Figs. 9 to 12 inclusive but instead of being one integral piece is composed of a plurality of parts. These parts are indicated generally as 39 and 40, and each is perforated to receive the clamping bolt 25 and each has a projection 41 on the tail portion thereof. The projection 41 on the tail portion of the lug 40 engages the wheel and the projecting portion 41 on the portion 39 engages the portion 40 of the lug which is preferably recessed slightly to receive the portion 41 as indicated clearly in Fig. 13. The upper portions of these lugs branch outwardly in opposite directions and they have the upper surfaces thereof so shaped that together they form a recess to receive the rim 28 substantially the same as illustrated in Figs. 9 to 12 inclusive. However, only one side of the rim is engaged by each portion of the lug whereby when the clamping pressure in the bolt 25 is released the outer portion 29 of the lug can be removed without the necessity of removing the entire lug. In fact the outer portion of the lug will pivot sufficiently upon release of the clamping pressure to permit the rim to be removed so that the lugs need not be entirely removed from the wheel. Each portion of the clamping lug has a portion adapted to engage the seats 22 or 23 on the wheel 20 and these portions are indicated at 42 and 43 respectively so that both portions of the lug are urged outwardly under the clamping pressure, forming substantially a unitary lug but having the advantage that these portions tend to exert a lateral gripping action on the rim as well as exerting a radial pressure on the inside of same. These lugs also have seats 44 and 45 which are used to cooperate with seats 22 or 23 as desired. This lug may be mounted in any of the positions illustrated in Figs. 9, 10, 11 and 12 to give the different tread widths.

Obviously, various changes can be made in the particular arrangement and construction of the parts shown in the drawings without departing from the spirit of my invention and, therefore, I do not wish to be limited in my invention except as may be hereinafter set forth in the claims.

Having thus fully described my invention, what I claim and desire to secure by Letters Patent of the United States is:

1. The combination with a wheel having an outer periphery provided with axially and oppositely sloping seats, a lug provided with at least two different seats, either of which is adapted to selectively cooperate with either of the seats on said wheel, means on said lug adapted to cooperate with a rim to hold said rim on said wheel when said lug is clamped in place, and means for clamping said lug in position with either of its seats cooperating with either one of the seats on said wheel to position the rim in different axial positions with respect to said wheel.

2. The combination with a wheel having an outer periphery provided with oppositely and axially sloping seats, a lug having a seat adapted to cooperate with either of the seats on said wheel, means on said lug adapted to cooperate with a rim to hold said rim in place on said wheel when said lug is clamped in operative position, and means for clamping said lug in either of its operative positions whereby said rim will be held in different axial positions on said wheel, said lug having at least one additional seat thereon adapted to cooperate with either of said seats on said wheel, the cooperating means on said lug and rim for locking the rim in axial position being arranged asymmetrically with respect to the two seats on said lug, whereby upon reversal of said lug with the lug arranged on the same side of the wheel the rim will be located in an axial offset position from the position which would occupy with the lug in the position which it occupied before reversal.

3. The combination with a wheel having a periphery formed with a plurality of tapered seats at different distances axially of the wheel, a rim, a plurality of lugs each having a plurality of tapered seats, any one of which is adapted to cooperate with any of the aforesaid seats on said wheel to variously position the lug on said wheel, and means on said lug adapted to cooperate with means on said rim to hold the latter in position on said wheel when said lug is clamped in position, said last-mentioned means being arranged asymmetrically of the seats thereon.

4. In combination with a wheel having the periphery thereof provided with tapering seats on opposite sides of a plane normal to the axis of said wheel, a rim, a plurality of lugs each having a seat adapted to cooperate selectively with either of said seats on said wheel, and means on said lugs adapted to interlock with means on said rim for holding said rim in position on said wheel, said lugs each having at least one other seat, each adapted to cooperate selectively with either seat on said wheel for mounting the rim in additional axial positions on said wheel.

5. In combination with a rim, a wheel having at least one pair of axially and oppositely tapered seats, of a lug having a pair of oppositely tapered seats, either one of which can be selectively engaged with either of the pair of seats on said wheel, means on said rim arranged to one side of the median plane thereof adapted to interlock with means on said lug to hold the same in interlocking relation, whereby upon reversal of the lug and rim the rim will occupy a different axial position with respect to said wheel.

6. In a device of the class described, the combination with a wheel having a tapered seat extending outwardly and axially, of a lug for supporting a rim having oppositely sloping seats thereon and a rim seat asymetrically disposed with respect to a median plane between said seats on said lug, a means for holding said lug with either of its seats abutting against said seat on said wheel, whereby to provide for positioning said rim in different axial positions with respect to said wheel, the clamping means effecting a radial movement of said lug to firmly hold a rim in operative position on said wheel.

7. The combination with a wheel having an axially tapered seat of a lug having at least two parts, each part having portions sloping in the same direction when the lugs are in operative relation to each other, and adapted to rest on said seat with said portions so aligned, the said parts having cooperating portions to support a rim and hold a portion of said rim therebetween against axial movement, and means for holding said lug in operative position on said seat.

8. The combination with a wheel having an axially tapered seat of a lug having at least two parts, each part having portions sloping in the same direction when the lugs are in operative relation to each other, and adapted to rest on said seat with said portions so aligned, the said parts having cooperating portions to support a rim and hold a portion of said rim therebetween against axial movement, and a single means for holding said lug in operative position on said seat.

9. The combination with a wheel having an outer periphery provided with axially and oppositely sloping seats of a rim for said wheel, a lug having a seat thereon adapted to cooperate selectively with either of said seats on said wheel, means on said lug releasably cooperating with means on said rim to hold said rim on said wheel when said lug is clamped in place, said lug sustaining and holding said rim in place, and means for selectively clamping said lug in position with its seat cooperating with either one of the seats on said wheel, said cooperating means on said lug and rim being so located axially of the wheel as to position the rim asymmetrically of the median plane between said seats on said wheel, whereby when the lug is mounted on either of the seats on the wheel while maintaining in each case the same cooperative relation with said rim, the rim will lie in a different axial position with respect to said wheel than when said lug is mounted on the other of said seats.

10. In a device of the class described, the combination with a wheel having oppositely disposed beveled seats facing outwardly and axially of a rim, at least one lug for supporting the rim on said wheel, said lug having at least one beveled seat selectively cooperating with either seat on said wheel and said lug and rim being separate and having readily engageable and disengageable cooperative means for locating the rim asymmetrically with respect to the median plane of said wheel, and clamping means for holding said lug in position on said wheel, said cooperative means cooperating with said lug and rim in either of said positions of said lug, and said cooperating seats on said wheel and lug effecting radially outward movement of said lug when the clamping pressure is applied to said clamping means whereby to hold the rim and lug in firm cooperating engagement.

11. A wheel comprising a wheel body, a gutter mounted tire rim adapted to be supported by said wheel body, a plurality of coplaner supporting bosses, each having oppositely tapered peripheral seats carried by the wheel body, a corresponding plurality of lugs movable radially with respect to the wheel body on either set of said seats and engaging the gutter of said rim for moving the rim into chorded position free of the wheel body so that the rim is supported entirely by said lugs, each of said lugs having portions engaging both the rim and seat over areas of contact and having depending shanks, the centers of pressure of which are offset with respect to each other to establish an overturning couple effective to free the lugs from the wheel body, fulcrum abutment means on the shanks of said lugs, and bolt means clamping said shanks to the sides of said bosses and establishing with said fulcrum abutment means a couple opposing said overturning couple to clamp said rim in position.

12. A wheel comprising a wheel body having a radially spaced series of bosses, each of said bosses having oppositely beveled peripheral seats, a series of clamping lugs having rim seating surfaces and depending shank portions, said rim seating surfaces being adapted to receive the gutter of a gutter mounted type tire rim, tapered surfaces extending from each face of said shank portions toward said rim seating surfaces whereby said lugs can be optionally mounted on either side of said bosses with either of said tapered surfaces engaging the adjacent beveled peripheral surface of said series of bosses, and means for clamping said lugs to the selected lateral faces of said bosses for wedging said lugs radially outwardly of said bosses on said beveled surfaces to move the rim into chorded position free of the wheel body.

13. In combination, a wheel body having circumferentially spaced radial projections disposed in a plane normal to the wheel axis and having oppositely tapered peripheral seats, a tire rim having a beveled edge, a series of clamping lugs having rim portions recessed to receive said edge and having depending shanks joined thereto by laterally spaced oppositely tapered wedge surfaces optionally adapted for engagement with either of said seats, laterally projecting abutments at the end of said shanks remote from said portions, and axially extending clamping means passing through said shanks and projections radially inwardly of said seats for wedging said lugs radially outwardly on said seats to chord said rim in a fixed plane parallel to said plane of said projections, said abutments limiting movement of said lugs relative to said seats.

ALVA W. WOODWARD.